United States Patent Office 3,708,358
Patented Jan. 2, 1973

3,708,358
PROPELLANT BINDER AND SYNTHESIS
Concetto T. Camilli, Morristown, and Lawrence J. Engel, Dunellen, N.J., assignors to Esso Research and Engineering Company
No Drawing. Filed Feb. 28, 1963, Ser. No. 262,295
Int. Cl. C06b 19/02; C06d 5/06
U.S. Cl. 149—7    7 Claims This invention relates to a process for crosslinking a high-energy polymer at low temperatures to form a solid rubbery binder with minimized degradation of the energetic polymer and of reactive and heat-sensitive oxidizer components present in the polymer, such as nitronium perchlorate. In particular, the crosslinking is effected at low temperatures, well below 0° C., by exposure of the polymer or mixture of the polymer with oxidizers in a solid state to gamma rays or equivalent radiation.

The present invention makes possible the preparation of new solid compositions of a crosslinked polyacrylate polymer or binder as a compatible matrix or coating of energetic materials, such as nitronium perchlorate. Such compositions, including crosslinked $NF_2$-containing polyacrylates, are available components of solid rocket propellants having an Isp (specific impulse) value above 270, and even as high as above 290. Such high impulse propellant compositions are generally indicated to contain a liquid $CNF_2$ component such as 1,2,3,4-tetrakis($NF_2$) butane, a solid oxygen oxidizer such as a perchlorate or nitro compound, a powdered metal-containing fuel, and a binder for the liquid and finely-divided solid components.

Even in dealing with the crosslinking of ordinary methacrylate polymers under normal or somewhat elevated temperatures by radiation, it has been noted that there are degradation effects in the polymer. The ordinary methacrylate polymers are polymer chains formed by linking esters of acrylic acid or such esters having an alpha-substituted alkyl group, e.g. methylmethacrylate. The ester groups in the polymerized acrylates are usually alkyl groups having 1 to 4 carbon atoms and, similarly, such alkyl groups may be used as the alpha substituents in the ester monomer.

There is a more difficult problem in polymerizing and crosslinking acrylate polymers which contain $NF_2$ groups and a still more difficult problem in carrying out the polymerization and crosslinking in the presence of heat-sensitive energetic compounds which have a tendency to be highly reactive with various organic compounds without degradation or undesired decomposition. However, such polymerization and crosslinking has been accomplished in accordance with the present invention.

There are mainly two types of energetic acrylates suitable for use in forming high-energy solid rocket propellant binders. One type of such acrylates includes the simple acrylates represented by 2,3-bis($NF_2$) n-propyl acrylate having the composition:

$$H_2C=CHCOOCH_2CH(NF_2)CH_2(NF_2)$$

The $NF_2$-containing polyether acrylates are more complex and are represented by acrylates formed by acrylating $N_2F_4$ adducts of unsaturated polyether alcohols, as, for example, an acrylate of the $N_2F_4$ adduct of poly(1,4-pentadiene monoxide) which also may be described as the polymer of [4,5-bis($NF_2$) pentene-1 oxide].

In many attempts to cure these types of acrylates, especially when they contain admixed liquid and solid oxidizers, at room temperature and above with conventional catalysts, difficulties arose through decompositions which led to gassing. A solid oxygen-oxidizer cannot be used in such mixtures on account of its high reactivity which would cause violent decomposition.

Among the simple acrylates containing $NF_2$ groups in high proportion is 1,2,4,5-tetrakis($NF_2$) amyl acrylate which polymerizes to form a polymer having the recurring unit composition: $[C_8H_{10}O_2(NF_2)_4]$.

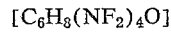

The $N_2F_4$ adduct of the polymer formed from 1,4-pentadiene monoxide is a polyether alcohol having the recurring unit composition: $[C_5H_8(NF_2)_2O]$. Another polyether of this type is the polymer of 1,2,5,6-tetrakis-($NF_2$) hexene-3 oxide having the recurring unit:

$$[C_6H_8(NF_2)_4O]$$

An $NF_2$-polyether alcohol is also obtained by polymerizing difluoramino oxetane and the polyether alcohol formed has a recurring unit of $NF_2$-containing methyl propene oxide. In general, such polymerizable polyether alcohols which can be acrylated and crosslinked may be described as poly($NF_2$-substituted alkylene oxides).

These polyether alcohols may be formed with modifying agents which aid in attaching OH terminal groups to the polyethers. Modifying agents such as $H_2O$, glycidol, ethylene glycol, and trimethylolpropane may be used to give the polymers from 1.5 to 3 OH groups per molecule or higher. Such polyether alcohols are converted to acrylates by reaction with acrylating agents such as acryloyl chloride, acrylic anhydride, acrylic acid, and homologous compounds having alpha-substituted alkyl groups. The resulting $NF_2$-polyether acrylates will contain in the range of about 40 to 60 or more wt. percent $NF_2$. Curing of these polyacrylates is necessary for achieving proper strength as binders.

The high-energy oxidizer binders are to be used in proportions of 5 to 30 wt. percent of the composite to hold together other components, such as the liquid oxidizers, solid oxygen-oxidizers and fuels such as powdered metals of the class comprising B, Al, Be, Li and Mg, and compounds of such metals, e.g. their hydrides. The liquid and solid oxidizers may be used in proportions of about 20 to 60 wt. percent and the solid fuels in proportions of about 1 to 10 wt. percent, usually.

Among the solid oxygen-oxidizer compounds which are suitable for high-energy propellants are ammonium perchlorate, hydrazine perchlorate, hydrazine diperchlorate, hydrazine nitroform, hexanitroethane and nitronium perchlorate. Nitronium perchlorate, which has the composition $NO_2ClO_4$, is one of the most potent solid oxygen-oxidizers, but has given most difficulty on account of its incompatability with various organic compounds, particularly unsaturated organic compounds; hence the need for an improved method of incorporating nitronium perchlorate into a propellant composite, particularly when the substances forming the binder have unsaturation, which is generally so. Nitronium perchlorate is such a potent oxygen oxidizer it can be used even with relatively low-energy binders.

In work aimed at polymerizing $NF_2$-containing polyacrylates and crosslinking the polymers at low temperatures, first the acrylates, such as the acrylate having the recurring monomer unit 4,5-bis($NF_2$) pentene-1 oxide, was chilled and exposed to gamma radiation at $-78°$ C. Samples were exposed to radiation rates of $6.25 \times 10^4$ rads/hr., $1.25 \times 10^5$ rads/hrs. and $2.5 \times 10^5$ rads/hr. for a period of 16 hrs. to give total radiation doses of 1, 2 and 4 megarads. The rad is the unit of absorbed dose and is 100 ergs per gram of $6.25 \times 10^{13}$ electron-volts per gram. The dose rate is expressed in rads per unit time.

The resulting polymers were all clear, rubbery solids with similar physical properties. The polymers were insoluble in acetonitrile, which is a general solvent for $NF_2$-containing organic compounds and is generally used as a solvent for molecular weight determination of such compounds. The polymers were also insoluble in acetone and carbon tetrachloride. The fact that the polymers were insoluble indicates that they are of high molecular weight and crosslinked.

The presence of the $NF_2$ groups in the acrylate molecular evidently facilitates the polymerization because methylacrylate, butylacrylate and methylmethacrylate fail to polymerize by irradiation at low temperature conditions that cause the polyether-$N_2F_4$ adduct acrylate and 2,3-bis($NF_2$) n-propyl acrylate to polymerize to the rubbery solids.

From the number of experiments caired out on the $NF_2$-containing polyether or poly($NF_2$-alkylene oxide) acrylates and the simple $NF_2$-containing alkyl acrylates, it was determined that satisfactory polymerization and crosslinking takes place at low temperatures, substantially below 0° C. to —78° C. or lower, using radiation doses of from about 1 to 6 or more megarads per gram. Somewhat lower or higher amounts of radiation may be used if desired in forming the crosslinked polymers. Further examples illustrate the polymerization of the $NF_2$-containing alkyl acrylates and crosslinking of the $NF_2$-containing polyether acrylates as employed with other ingredients of solid rocket propellants.

EXAMPLE 1

Polymerization of the $NF_2$-containing polyether acrylate derived from the polyether having the 4,5-bis($NF_2$) pentene-1 oxide unit was carried out in the presence of hexakis($NF_2$) propyl ether and 1,2,3,4-tetrakis($NF_2$) butane, liquid oxidizers in 50/50 mixtures with the polyether acrylate. These components were mutually soluble. The polymerization was carried out for 16 hrs. at temperatures of 0° to —78° C. with total radiation doses of 4 megarads to obtain jel products. The resulting polymer jels were still insoluble in the usual solvents of $NF_2$-containing compounds, indicating that the jel consisted of a polymer similar to that formed in the absence of a liquid $NF_2$ oxidizer which plasticizes the polymer.

EXAMPLE 2

In preparing a propellant starting with nitronium perchlorate as solid oxygen-oxidizer and a viscous liquid acrylate of poly[4,5-bis($NF_2$) pentene-1 oxide], the major problem is to prevent reaction of the nitronium perchlorate with the unsaturated prepolymer having reactive acrylate groups. The prepolymer was first cooled to Dry Ice temperature of about —78° C., then warmed up only enough to allow mixing of nitronium perchlorate with the prepolymer, then cooled to —78° C. for polymerization. Polymerization was carried out at a total radiation dose of 4 megarads over a period of 16 hrs.

In a number of these experiments, the nitronium perchlorate was compressed into ⅛ inch pellets. This made it possible to look through the sample to see if any bubbles are formed in the interface of the nitronium perchlorate pellets and the polymer matrix or coating. When nitronium perchlorate is admixed as a powder, the mixture is opaque. No gas bubbles were observed in the mixture or found to be formed after storage for 10 days at room temperature.

The experiments showed that particles of nitronium perchlorate could be satisfactorily coated by the cured $NF_2$-containing acrylate polymers when the mixing is done at temperatures preferably below —25° C. and the polymerization is induced by gamma radiation at the low temperatures. The thus coated nitronium perchlorate particles may be produced to be admixed with other materials which may tend to be reacted with the uncured nitronium perchlorate.

EXAMPLE 3

The monomer bis($NF_2$) propyl acrylate was polymerized under the same conditions as set forth in the previous examples to give a product of similar appearance. Lower temperatures were found to be necessary in admixing the nitronium perchlorate with the bis($NF_2$) propyl acrylate to avoid appreciable gasing, and the lower viscosity of the bis($NF_2$) propyl acrylate permitted the mixing at lower temperatures of —60° C.

Mixtures of polymerized bis($NF_2$) propyl acrylate containing the nitronium perchlorate showed no bubbles of gas after storage of 10 days at room temperature.

In transforming 2,3-bis($NF_2$) n-propyl acrylate to a rubbery solid polymer using a cobalt-60 source of gamma radiation, the products formed after 1,2, and 4 megarad doses were analyzed and it was determined that there was no appreciable degradation based on the constancy of the carbon and nitrogen analyses. In addition, the polymer was found to be of high molecular weight and completely crosslinked; it was not soluble in solvents such as acetonitrile.

EXAMPLE 4

The polymerization and crosslinking of the $NF_2$-containing acrylates at low temperatures permits the curing of the formulations using the resulting acrylate polymers as binders, even though the monomers or prepolymers are reacted with nitronium perchlorate at ambient or higher temperatures. The composites made using the $NF_2$-containing acrylates with nitronium perchlorate using the low temperature radiation technique is applied to the following type of formulation to obtain propellants having Isp values of 290 or more.

| Formulation: | Wt. percent |
|---|---|
| Binder of $NF_2$-containing acrylate | 20 |
| Oxidizer of tetrakis($NF_2$) butane or hexakis($NF_2$) propyl ether | 25 |
| Nitronium perchlorate | 46 |
| Boron powder | 9 |

Modifications can be made in using liquid $NF_2$-containing oxidizers which are alkanes, cycloalkanes, dialkyl ethers and epoxy alkanes having 2 to 10 carbon atoms per molecule and an $NF_2$ group linked to each carbon atom.

There are a number of ways of formulating propellants to have them contain a highly reactive solid oxygen-oxidizer, such as nitronium perchlorate. The nitronium perchlorate particles may first be coated at low temperature with the compatible $NF_2$-containing acrylate polymer at the low temperatures and thus coated particles may then be mixed with the other components at a higher temperature, such as ambient temperature. In handling and carrying out the coating of the nitronium perchlorate, it is important to make the preparation in very dry atmospheres because experience has shown that only trace amounts of water make the nitronium perchlorate more reactive and less compatible with other compounds, such as even $NF_2$-containing compounds. Tests have shown that the nitronium perchlorate in high proportions, e.g. 45 wt. percent, with liquid tetrakis($NF_2$) butane and polyacrylate in the amount of 15 wt. percent made into a strand for burning, had a reasonable burning rate at pressures up to 2000 p.s.i.a. Relatively low-energy polymers may be dissolved in the liquid $NF_2$-containing oxidizer or admixed with the nitronium perchlorate, if compatible therewith, to control the rate of burning. For example, in a formulation wherein polymethylmethacrylate dissolved in a proportion of about 3 parts by weight to 8 parts by weight of tetrakis($NF_2$) butane liquid which was admixed with about equal parts by weight of nitronium perchlorate, the resulting burning rate at 1000 to 2000 p.s.i.a. was from about 3 to 4 inches per second.

It will be noted that the main purpose of curing the $NF_2$-containing polyacrylates of either $NF_2$-substituted acrylates or $NF_2$-substituted polyether acrylates is to obtain the mixing and curing to a solid rubbery binder in the presence of a solid oxygen-oxidizer which would cause undesired decomposition at ordinary temperatures when mixed with the uncured acrylates. The solid oxygen-oxidizer $NO_2ClO_4$ represents one of the most reactive oxidizers which vigorously attacks unsaturated organic compounds at ordinary temperatures. However, any of the other high-energy solid oxygen oxidizers may be pelleted and coated by the cured $NF_2$-containing polyacrylates or contained enveloped by these polymers as a binder matrix with the same low temperature technique to minimize decomposition. In general, the solid oxygen-oxidizers are compounds which contain a perchlorate ($ClO_4$) group, a nitro ($NO_2$) group, a nitrate ($ONO_2$) group, or mixed oxidizing groups. They may also contain $NF_2$ groups with an oxygen oxidizing group.

Examples of these highly reactive solid oxygen-oxidizers are ammonium perchlorate ($NH_4ClO_4$), lithium perchlorate ($LiClO_4$), hydrazine perchlorate $$(N_2H_5ClO_4)$$

hydrazine nitroformate $[N_2H_4(HNO_3)]$, hexanitroethane $[(C_2NO_2)_6]$, among others.

Basically, the high-energy solid propellants are formulated to have the solid oxygen-oxidizers distributed in and held together by a high-energy binder with a liquid $NF_2$-containing oxidizer absorbed in the binder as is a plasticizer. The composite may also contain a small amount of metal or metal compound fuel, e.g. from about 1 to 10 wt. percent of aluminum powder, boron powder, etc. In some instances, pelleting and coating the solid oxygen-oxidizer may help control the burning rate, the coating being compatible with the solid oxygen-oxidizer.

In general, a binder contributes a lower amount of energy, but the $NF_2$-containing polymer binders make a substantial contribution to the energy in their $NF_2$ oxidizing group content. These polymers containing $NF_2$ groups preferably may contain from about 40 to 70 wt. percent $NF_2$, depending upon the monomeric unit and amount of inert crosslinking radical or material which has to be used.

The invention described is claimed as follows:

1. A compatible mixture of $NF_2$-containing acrylate polymer coating on nitronium perchlorate, and $NF_2$-containing acrylate being crosslinked so that it is insoluble in acetonitrile.

2. A method of curing $NF_2$-containing acrylate polymer in contact with a solid oxygen oxidizer, which comprises admixing the solid oxygen-oxidizer with the $NF_2$-containing acrylate to be polymerized and crosslinked at a temperature sufficiently below 0° C. to prevent reaction of the solid oxygen-oxidizer with the admixed acrylate and polymerizing the acrylate by exposure to gamma radiation in the mixture at a sufficiently low temperature below 0° C. to prevent reaction of the solid oxygen-oxidizer with acrylate.

3. A compatible mixture of a solid oxygen-oxidizer with an $NF_2$-containing acrylate polymer cured to a rubbery solid without decomposition.

4. Nitronium perchlorate contained in a compatible crosslinked polymer of bis($NF_2$) propyl acrylate.

5. Nitronium perchlorate contained in a compatible crosslinked polymer of tetrakis($NF_2$) amyl acrylate.

6. Nitronium perchlorate contained in a compatible crosslinked polymer of $NF_2$-containing polyether acrylate in which the recurring monomeric unit is 4,5-bis($NF_2$) pentene-1 oxide.

7. Nitronium perchlorate contained in a compatible crosslinked polymer of $NF_2$-containing polyether acrylate in which the recurring monomeric unit is 1,2,5,6-tetrakis ($NF_2$) hexene-3 oxide.

References Cited

UNITED STATES PATENTS

| | | | |
|---|---|---|---|
| 3,071,923 | 1/1963 | D'Alelio | 60—35.4 |
| 3,003,310 | 10/1961 | D'Alelio | 149—60 X |
| 3,070,470 | 12/1962 | Argabright et al. | 149—60 X |
| 3,017,260 | 1/1962 | Arquette et al. | 149—60 |

BENJAMIN R. PADGETT, Primary Examiner

U.S. Cl. X.R.

149—8, 19, 20, 36, 74